United States Patent
Moffat et al.

(10) Patent No.: US 12,544,587 B2
(45) Date of Patent: Feb. 10, 2026

(54) PHOTOTHERAPEUTIC SYSTEMS INCLUDING SPREADING AND COLLIMATING FEATURES AND RELATED TECHNOLOGY

(71) Applicant: SOLIUS LABS, INC., Bainbridge Island, WA (US)

(72) Inventors: William Alexander Moffat, Bainbridge Island, WA (US); Keith Kirkwood, Bainbridge Island, WA (US); Jeff Stewart, Bainbridge Island, WA (US); Jeff Allison, Bainbridge Island, WA (US); Brian Shay, Bainbridge Island, WA (US); Ned Nestorovic, Bainbridge Island, WA (US)

(73) Assignee: SOLIUS LABS, INC., Bainbridge Island, WA (US)

( * ) Notice: Subject to any disclaimer, the term of this patent is extended or adjusted under 35 U.S.C. 154(b) by 450 days.

(21) Appl. No.: 16/337,710

(22) PCT Filed: Sep. 29, 2017

(86) PCT No.: PCT/US2017/054578
§ 371 (c)(1),
(2) Date: Mar. 28, 2019

(87) PCT Pub. No.: WO2018/067411
PCT Pub. Date: Apr. 12, 2018

(65) Prior Publication Data
US 2020/0030628 A1 Jan. 30, 2020

Related U.S. Application Data

(60) Provisional application No. 62/403,590, filed on Oct. 3, 2016.

(51) Int. Cl.
*A61N 5/06* (2006.01)

(52) U.S. Cl.
CPC ......... *A61N 5/0618* (2013.01); *A61N 5/0614* (2013.01); *A61N 5/0616* (2013.01);
(Continued)

(58) Field of Classification Search
CPC ........................... A61N 5/0618; A61N 5/0614
See application file for complete search history.

(56) References Cited

U.S. PATENT DOCUMENTS 5,265,598 A * 11/1993 Searfoss .............. A61N 5/0618
600/27
5,531,664 A    7/1996 Adachi et al.
(Continued)

FOREIGN PATENT DOCUMENTS

CN    101045177    10/2007
CN    101548895    10/2009
(Continued)

OTHER PUBLICATIONS

"Asahi Spectra Optical Filters," https://web.archive.org/web20100516083o4/http://www.asahispectra.com/opticalfilters/uv_bandpass_filter.html; archive of website from 2010, 2 pages.
(Continued)

*Primary Examiner* — James M Kish
*Assistant Examiner* — James Moss
(74) *Attorney, Agent, or Firm* — Perkins Coie LLP

(57) ABSTRACT

A phototherapeutic system in accordance with an embodiment of the present technology includes a housing at least partially defining an irradiation zone configured to accommodate at least a portion of a human subject. The system further comprises an ultraviolet (UV) radiation source configured to direct UV radiation along a radiation path extending from the radiation source to the irradiation zone. The (Continued)

radiation source includes a concentrated source at which UV radiation is generated, and a collimating reflector (or lens) configured to reflect (or refract) the UV radiation and thereby increase collimation of the UV radiation. The system still further comprises a filter, a spreader, and a collimator disposed successively farther downstream from the radiation source along the radiation path. The spreader and the collimator respectively decrease and increase collimation of the UV radiation before the UV radiation reaches the subject.

37 Claims, 6 Drawing Sheets

(52) U.S. Cl.
CPC ............... *A61N 2005/064* (2013.01); *A61N 2005/0642* (2013.01); *A61N 2005/0652* (2013.01); *A61N 2005/0661* (2013.01); *A61N 2005/0665* (2013.01); *A61N 2005/0667* (2013.01)

(56) References Cited

U.S. PATENT DOCUMENTS

| | | | |
|---|---|---|---|
| 5,576,591 A | 11/1996 | Block et al. | |
| 6,402,774 B1 | 6/2002 | Caldironi | |
| 6,413,268 B1 | 7/2002 | Hartman | |
| 6,436,127 B1 | 8/2002 | Anderson et al. | |
| 6,567,999 B1 | 5/2003 | Thurner | |
| 7,638,780 B2* | 12/2009 | Kilburn | F26B 3/28 |
| | | | 118/620 |
| 8,647,373 B1 | 2/2014 | Shepherd et al. | |
| 10,226,641 B2 | 3/2019 | Moffat | |
| 12,239,845 B2 | 3/2025 | Moffat et al. | |
| 2001/0003800 A1 | 6/2001 | Crowley | |
| 2003/0045916 A1 | 3/2003 | Anderson et al. | |
| 2003/0100935 A1 | 5/2003 | Kratz | |
| 2004/0138726 A1 | 7/2004 | Savage et al. | |
| 2004/0186082 A1 | 9/2004 | Hartman | |
| 2004/0225339 A1 | 11/2004 | Yaroslavsky et al. | |
| 2005/0015124 A1 | 1/2005 | Irwin | |
| 2005/0143793 A1 | 6/2005 | Korman et al. | |
| 2005/0148270 A1 | 7/2005 | Eden | |
| 2005/0261750 A1 | 11/2005 | McDaniel | |
| 2006/0106435 A1 | 5/2006 | Fraval | |
| 2006/0151709 A1 | 7/2006 | Hahl | |
| 2006/0206173 A1 | 9/2006 | Gertner et al. | |
| 2006/0217789 A1 | 9/2006 | Perez | |
| 2007/0208395 A1 | 9/2007 | Leclerc | |
| 2007/0233210 A1 | 10/2007 | Morita et al. | |
| 2008/0103560 A1 | 5/2008 | Powell et al. | |
| 2008/0125834 A1 | 5/2008 | Hendrix et al. | |
| 2008/0172113 A1 | 7/2008 | Gourgouliatos et al. | |
| 2008/0211378 A1 | 9/2008 | Dutta et al. | |
| 2008/0224592 A1 | 9/2008 | Reich et al. | |
| 2008/0312721 A1 | 12/2008 | Lemieux | |
| 2009/0005839 A1 | 1/2009 | Griffith et al. | |
| 2009/0020711 A1* | 1/2009 | Hansmann | G21K 1/10 |
| | | | 250/492.3 |
| 2009/0093799 A1 | 4/2009 | Davenport et al. | |
| 2009/0118799 A1 | 5/2009 | Nanninga | |
| 2009/0134345 A1* | 5/2009 | Gentry | A61N 5/1031 |
| | | | 250/503.1 |
| 2010/0185064 A1 | 7/2010 | Bandic et al. | |
| 2010/0241196 A1* | 9/2010 | Meyer | G02B 3/08 |
| | | | 607/88 |
| 2010/0331929 A1 | 12/2010 | Burrows et al. | |
| 2011/0004280 A1 | 1/2011 | Irwin | |
| 2011/0212410 A1 | 9/2011 | Fiset | |
| 2011/0218595 A1 | 9/2011 | McMillan | |
| 2011/0299056 A1* | 12/2011 | Williamson | G03F 7/70983 |
| | | | 355/71 |
| 2012/0039827 A1 | 2/2012 | Chaudhuri | |
| 2012/0071954 A1 | 3/2012 | Kao et al. | |
| 2012/0148976 A1 | 6/2012 | Brawn | |
| 2012/0282135 A1 | 11/2012 | Trapani | |
| 2013/0018442 A1 | 1/2013 | Irwin et al. | |
| 2013/0030264 A1 | 1/2013 | Gopalakrishnan et al. | |
| 2013/0131762 A1 | 5/2013 | Oversluizen | |
| 2013/0172963 A1* | 7/2013 | Moffat | A61N 5/0616 |
| | | | 607/94 |
| 2013/0231720 A1 | 9/2013 | Luellau | |
| 2013/0245724 A1 | 9/2013 | Kaufman | |
| 2013/0253621 A1 | 9/2013 | DeLuca et al. | |
| 2013/0310730 A1 | 11/2013 | Goren et al. | |
| 2014/0074193 A1 | 3/2014 | Luzon | |
| 2014/0121732 A1 | 5/2014 | Goren et al. | |
| 2014/0276248 A1 | 9/2014 | Hall | |
| 2014/0277299 A1 | 9/2014 | Intintoli | |
| 2015/0087685 A1 | 3/2015 | Khan | |
| 2015/0088231 A1* | 3/2015 | Rubinfeld | A61F 9/0079 |
| | | | 607/90 |
| 2015/0102208 A1 | 4/2015 | Appelboom et al. | |
| 2015/0165229 A1* | 6/2015 | Rodrigues | A61N 5/0621 |
| | | | 607/90 |
| 2015/0217130 A1 | 8/2015 | Gross et al. | |
| 2015/0217132 A1 | 8/2015 | Makkapati et al. | |
| 2015/0238774 A1 | 8/2015 | Anderson et al. | |
| 2016/0048826 A1 | 2/2016 | Fefferman | |
| 2016/0129279 A1 | 5/2016 | Ferolito | |
| 2016/0303395 A1 | 10/2016 | Moffat | |
| 2016/0317686 A1 | 11/2016 | Dayton | |
| 2017/0056238 A1 | 3/2017 | Yi et al. | |
| 2017/0118854 A1 | 4/2017 | Dumont | |
| 2017/0225006 A1 | 8/2017 | Anderson et al. | |
| 2018/0014777 A1 | 1/2018 | Amir et al. | |
| 2018/0056088 A1 | 3/2018 | Moffat | |
| 2018/0133503 A1 | 5/2018 | Moffat | |
| 2018/0206779 A1 | 7/2018 | Kono | |
| 2018/0353770 A1* | 12/2018 | Moffat | A61N 5/0616 |
| 2018/0360709 A1 | 12/2018 | Rabe et al. | |
| 2018/0369604 A1 | 12/2018 | Gamelin | |
| 2019/0099613 A1 | 4/2019 | Estes et al. | |
| 2019/0133515 A1 | 5/2019 | Park | |
| 2019/0160303 A1 | 5/2019 | Moffat, IV | |
| 2020/0212265 A1 | 7/2020 | Ho et al. | |
| 2020/0376292 A1 | 12/2020 | Moffat et al. | |
| 2020/0391049 A1 | 12/2020 | Moffat et al. | |
| 2020/0396292 A1 | 12/2020 | Moffat et al. | |
| 2021/0128939 A1 | 5/2021 | Verghese | |
| 2022/0249863 A1 | 8/2022 | Moffat et al. | |
| 2022/0383496 A1 | 12/2022 | D'Amelio | |
| 2023/0347164 A1 | 11/2023 | Lauder et al. | |
| 2025/0050129 A1 | 2/2025 | Good | |

FOREIGN PATENT DOCUMENTS

| | | |
|---|---|---|
| CN | 201871131 | 6/2011 |
| CN | 104168953 | 7/2013 |
| CN | 107427688 | 8/2016 |
| CN | 106573155 A | 4/2017 |
| DE | 7623367 | 2/1977 |
| DE | 3126236 | 1/1983 |
| DE | 9000705 | 3/1990 |
| DE | 19622074 A1 | 12/1997 |
| DE | 20114790 | 12/2001 |
| DE | 10240716 | 3/2004 |
| DE | 202008004045 | 6/2008 |
| DE | 202008016045 | 4/2009 |
| EP | 545887 A1 | 6/1993 |
| EP | 1504792 | 2/2005 |
| EP | 1529552 | 5/2005 |
| EP | 1839703 | 10/2007 |
| EP | 1849497 | 10/2007 |
| EP | 1916017 | 4/2008 |
| EP | 2228098 | 9/2010 |
| GB | 2020970 | 11/1979 |
| JP | H05-220231 | 8/1993 |
| JP | 10-295837 | 10/1998 |
| JP | 3075306 B2 | 8/2000 |
| JP | 2008-500846 | 10/2005 |
| JP | 2007267936 A | 10/2007 |

(56) References Cited

FOREIGN PATENT DOCUMENTS

| | | |
|---|---|---|
| JP | 2008-73148 | 4/2008 |
| WO | WO9917668 | 4/1999 |
| WO | WO-200002491 | 1/2000 |
| WO | WO-2003047682 | 6/2003 |
| WO | WO2007001364 | 1/2007 |
| WO | WO2007106856 | 9/2007 |
| WO | WO-2007143862 | 12/2007 |
| WO | WO-2008027438 | 3/2008 |
| WO | WO-2010016009 | 2/2010 |
| WO | WO2011097383 | 8/2011 |
| WO | WO2012142427 | 10/2012 |
| WO | WO-2013103743 | 7/2013 |
| WO | WO-2015061773 A1 | 4/2015 |
| WO | WO2015/130891 | 9/2015 |
| WO | WO2016/007798 | 1/2016 |
| WO | WO-2016127120 A1 | 8/2016 |
| WO | WO2016/154343 | 9/2016 |
| WO | WO2016/176360 | 11/2016 |
| WO | WO2016203461 | 12/2016 |
| WO | 2017019455 A2 | 2/2017 |
| WO | WO2017136891 | 8/2017 |
| WO | WO2018067411 | 4/2018 |
| WO | 2019118773 A1 | 6/2019 |
| WO | WO2019/118777 | 6/2019 |

OTHER PUBLICATIONS

Ala-Houhala, MJ., et al., "Comparison of narrow-band ultraviolet B exposures and oral vitamin D substitution on serum 25-hydroxyvitamin D concentration," *Br J Dermatol.* Apr. 2012. (5 pgs).

Australian Exam Report for co-pending Australian Application No. 2013206887, Applicant: BeneSol, Inc.; Date of Mailing: Feb. 24, 2017, 4 pages.

Bouillon, R., et al., "Action spectrum for production of previtamin D3 in human skin," *CIE Technical Report 174, Commission International de l'Eclairage (CIE).* 2006. (16 pgs).

Brozyna, et al., "Mechanism of UV-related carcinogenesis and its contribution to nevi/melanoma," Oct. 8, 2008, National Institute of Health Public Access, pp. 2 and 4.

Bruls, WA., et al., "Transmission of UV-radiation through human epidermal layers as a factor influencing the minimal erythema dose," *Photochemistry and Photobiology.* Jan. 1984. (5 pgs).

Bunker, JWM., et al., "Precise evaluation of ultraviolet therapy in experimental rickets," *New England Journal of Medicine.* 1937. (6 pgs).

Changaris, DG., et al., "Pulsed UVB Irradiation Converts 7-dehydrocholesterol to previtamin D3 and Photoproducts," 2001. (10 pgs).

Chen, TC., et al., "Factors that influence the cutaneous synthesis and dietary sources of vitamin D," Archives of Biochemistry and Biophysics. Apr. 15, 2007. (4 pgs).

Clemens, TL., et al., "Increased skin pigment reduces the capacity of skin to synthesis vitamin D3," *Lancet.* Jan. 1982. (3 pgs).

De Fabo, EC., et al., "Mechanism of immune suppression by ultraviolet irradiation in vivo. I. Evidence for the existence of a unique photoreceptor in skin and its role in photoimmunology," *The Journal of Experimental Medicine.* Jul. 1983. (15 pgs).

Devgun, MS., et al., "Tanning, protection against sunburn and vitamin D formation with a UV-A 'sun-bed'". *The British Journal of Dermatology.* Sep. 1982. (11 pgs).

Diffey, BL. "Observed and predicted minimal erythema doses: a comparative study," *Photochemistry and Photobiology.* Oct. 1994. (3 pgs).

Diffey, BL., et al., "A preliminary study on photoaddition and erythema due to UVB radiation," *Physics in Medicine and Biology.* Apr. 1984. (8 pgs).

English Translation of Japanese Office Action for Application No. 2014-550552, Applicant: BeneSol, Inc.; Date of Mailing: Oct. 4, 2016, 10 pages.

English Translation of Russian Office Action for Application No. 2014131906, Applicant: BeneSol, Inc.; Date of Mailing: Nov. 21, 2016, 10 pages.

English Translation of Second Japanese Office Action for Application No. 2014-550552, Applicant: BeneSol, Inc.; Date of Mailing: Jul. 28, 2017, 8 pages.

Extended European Search Report in Application No. 13733883.6, Applicant: BeneSol, Inc., Date of Mailing: May 12, 2015, 7 pages.

Farr, PM., et al., "The erythemal response of human skin to ultraviolet radiation," *The British Journal of Dermatology.* Jul. 1985. (13 pgs).

First European Examination Report in Application No. 13733883.6, Applicant: BeneSol, Inc., Date of Mailing: Sep. 1, 2016, 4 pages.

Galkin, ON., et al., "Vitamin D' viodosimeter: basic characteristics and potential applications," *Journal of Photochemistry and Photobiology.* Nov. 1999. (8 pgs).

Guilhou, JJ., et al., "Vtiman D metabolism in psoriasis before and after phototherapy," *Acta Derm Venereol.* 1990. (5 pgs).

Haddad, JG., et al., "Human plasma transport of vitamin D after its endogenous synthesis," *J Clin Invest.* Jun. 1993. (4 pgs).

Holick, MF. "Environmental factors that influence the cutaneous production of vitamin D," *Am J Clin Nutr.* Mar. 1995. (8 pgs).

Holick, MF. "Sunlight, UV-radiation, vitamin D and skin cancer: how much sunlight do we need?" *Advances in Experimental Medicine and Biology.* 2008. (15 pgs).

Holick, MF., et al., "Skin as the site of vitamin D synthesis and target tissue for 1,25-dihydroxyvitamin D3. Use of calcitriol (1,25-dihydroxyvitamin D3) for treatment of psoriasis," *Archives of Dermatology.* Dec. 1987. (14 pgs).

Holick, MF., et al., "Photosynthesis of previtamin D3 in human skin and the physiologic consequences," *Science.* Oct. 1980. (3 pgs).

Holick, MF., et al., "Regulation of cutaneous previtamin D3 photosynthesis in man: skin pigment is not an essential regulator," *Science.* Feb. 1981. (4 pgs).

Holick, MF., et al., "The photoproduction of 1 alpha,25-dihydroxyvitamin D3 in skin: an approach to the therapy of vitamin-D-resistant syndromes," *The New England Journal of Medicine.* Aug. 1980. (6 pgs).

Hume, EM., et al., "On the Absorption of Vitamin D from the Skin," *The Biochemical Journal.* 1927. (6 pgs).

International Search Report and Written Opinion for International Application No. PCT/US2014/062352 filed Oct. 27, 2014, Applicant: BeneSol, Inc., Date of Mailing: Feb. 5, 2015, 12 pages.

International Search Report and Written Opinion for International Application No. PCT/US2016/016873 filed Feb. 5, 2016, Applicant: BeneSol, Inc., Date of Mailing: May 5, 2016, 12 pages.

International Search Report and Written Opinion for International Application No. PCT/US2016/029615 filed Apr. 27, 2016, Applicant: BeneSol, Inc., Date of Mailing: Oct. 7, 2016, 14 pages.

Jablonski, NG., et al., "The evolution of human skin coloration," Journal of Human Evolution. Jul. 2000. (50 pgs).

Knudson, A., et al., "Quantitative studies of the effectiveness of ultraviolet radiation of various wave-lengths in rickets," *Journal Biological Chemistry.* 1938. (13 pgs).

Krause, R., et al., "UV radiation and cancer prevention: what is the evidence?" *Anticancer Research.* Jul. 2006. (5 pgs).

Lehmann, B., "The vitamin D3 pathway in human skin and its role for regulation of biological processes," *Photochemistry and Photobiology.* 2005. (6 pgs).

Lehmann, B., et al., "A novel pathway for hormonally active calcitriol," *Hormone Research.* 2000. (4 pgs).

Lehmann, B., et al., "Demonstration of UVB-induced synthesis of 1 alpha,25-dihydroxyvitamin D3 (calcitriol) in human skin by microdialysis," *Archives of Dermatological Research.* Apr. 2003. (5 pgs).

Lehmann, B., et al., "Rold for tumor necrosis factor-alpha in UVB-induced conversion of 7-dehydrocholesterol to 1alpha, 25-dihydroxyvitamin D3 in cultured keratinocytes," *The Journal of Steroid Biochemistry and Molecular Biology.* May 2004. (5 pgs).

Lehmann, B., et al., "The UVB-induced synthesis of vitamin D3 and 1alpha,25-dihydroxyvitamin D3 (calcitriol) in organotypic cultures of keratinocytes: effectiveness of the narrowband Philips TL-01 lamp (311 nm)." *J Steroid Biochem Mol Biol.* Mar. 2007. (4 pgs).

(56) References Cited

OTHER PUBLICATIONS

Lehmann, B., et al., "UVB-induced conversion of 7-dehydrocholesterol to 1 alpha,25-dihydroxyvitamin D3 (calcitriol) in the human keratinocyte line HaCaT," *Photochemistry and Photobiology*. Dec. 2000. (10 pgs).

Lehmann, B., et al., "UVB-induced conversion of 7-dehydrocholesterol to 1alpha,25-dihydroxyvitamin D3 in an in vitro human skin equivalent model," *The Journal of Investigative Dermatology*. Nov. 2001. (7 pgs).

Lesiak, A., et al., "Vitamin D serum level changes in psoriatic patients treated with narrowband ultra violet B phototherapy are related to the season of the irradiation," *Photodermatol Photoimmunol Photomed*. Dec. 2011. (7 pgs).

Liu, W., et al., "Skin phototyping in a Chinese female population: analysis of four hundred and four cases from four major cities of China," *Photodermatology, Photoimmuniology and Photomedicine*. Aug. 2006. (5 pgs).

MacLaughlin, JA., et al., "Spectral character of sunlight modulates photosynthesis of previtamin D3 and its photoisomers in human skin," *Science*. May 1982. (3 pgs).

Marcus, M., "Make Your Day Better With D," *USA Weekend*. Nov. 2011. (3 pgs).

Maughan, G.H. "Ultra-violet wavelengths valuable in the cure of rickets in chickens," *American Journal of Physiology*. 1928. (18 pgs).

McLoone, P., et al., "An action spectrum for the production of cis-urocanic acid in human skin in vivo," *The Journal of Investigative Dermatology*. May 2005. (4 pgs).

Mead, MN. "Benefits of sunlight: a bright spot for human health," *Environmental Health Perspectives*. Apr. 2008. (13 pgs).

Moan, J., et al., "Sunbeds as vitamin D Sources." *Photochemistry and Photobiology*. Nov. 2009. (8 pgs).

Nemanic, MK., et al., "In vitro synthesis of vitamin D-3 by cultured human keratinocytes and fibroblasts: action spectrum and effect of AY-9944," *Biochimica et Biophysica Acta*. Sep. 1985. (11 pgs).

Norval, M. et al., "Is the action spectrum for the UV-induced production of previtamin D3 in human skin correct?" *Photochemical & Photobiological Sciences*. Jan. 2010. (7 pgs).

Obi-Tabot, ET., et al., "A human skin equivalent model that mimics the photoproduction of vitamin D3 in human skin," *In Vitro Cellular & Developmental Biology*. Mar. 2000. (6 pgs).

Olds, WJ., et al., "In vitro model of vitamin D3 (cholecalciferol) synthesis by UV radiation: dose-response relationships," *Journal of Photochemistry and Photobiology*. Nov. 2008. (6 pgs).

Osmancevic, A., et al., "UVB therapy increases 25(OH) vitamin D syntheses in postmenopausal women with psoriasis," *Photodermatol Photoimmunol Photomed*. Oct. 2007. (7 pgs).

Osmancevic, A., et al., "Vitamin D production in psoriasis patients increases less with narrowband thatn with broadband ultraviolet B phototherapy." *Photodermatol Photoimmunol Photomed*. Jun. 2009. (5 pgs).

Osmancevic, A., et al., "Vitamin D status in psoriasis patients during different treatments with phototherapy," *J Photochem Photobiol B*. Nov. 2010. (7 pgs).

Parrish, JA., et al., "Action spectrum for phototherapy of psoriasis," *The Journal of investigative Dermatology*. May 1981. (5 pgs).

Partial Supplementary European Search Report for co-pending European Patent Application No. 14856603.7, Applicant: BeneSol, Inc., Mailed Apr. 13, 2017, 7 pages.

Porojnicu, AC., et al., "Sun beds and cod liver oil as vitamin D sources," *Journal of Photochemistry and Photobiology*. May 2008. (7 pgs).

Ryan, C., et al., "The effect of narrowband UV-B treatment for psoriasis on vitamin D status during wintertime in Ireland," *Arch Dermatol*. Aug. 2010. (8 pgs).

Sage, RJ., et al., "UV-based therapy and vitamin D," *Dermatologic Therapy*. Jan. 2010. (10 pgs).

Scientific Committee on Consumer Products, "Opinion on Biological effects of ultraviolet radiation relevant to health with particular reference to sunbeds for cosmetic purposes," *European Commission Health & Consumer Protection Directorate-General*. 8th plenary of the SCCP on Jun. 20, 2006. (43 pgs).

Stamp, TC., et al., "Comparison of oral 25-hydroxycholecalciferol, vitamin D, and ultraviolet light as determinants of circulating 25-hydroxyvitamin D," *Lancet*. Jun. 25, 1977. (3 pgs).

Suh, KS., et al., "Long-term evaluation of erythema and pigmentation induced by ultraviolet radiations of different wavelengths," *Skin Research and Technology*. May 2007. (8 pgs).

Tangpricha, V., et al., "Tanning is associated with optimal vitamin D status (serum 25-hydroxyvitamn D concentration) and higher bone mineral density." *The American Journal of Clinical Nutrition*. Dec. 2004. (5 pgs).

Terenetskaya, I. "Two methods for direct assessment of the Vitamin D synthetic capacity of sunlight and artificial UV sources," *The Journal of Steroid Biochemistry and Molecular Biology*. May 2004. (4 pgs).

Vahavihu, K., et al. "Heliotherapy improves vitamin D balance and atopic dermatitis," *The British Journal of Dermatology*. Jun. 2008. (6 pgs).

Vantieghem, K., et al., "UVB-induced production of 1,25-dihydroxyvitamin D3 and vitamin D activity in human keratinocytes pretreated with a sterol delta7-reductase inhibitor," *J Cell Biochem*. May 2006. (12 pgs).

Walterscheid, JP., et al., "Cis-urocanic acid, a sunlight-induced immunosuppressive factor, activates immune suppression via the 5-HT2A receptor," *Proc. Natl. Acad. Sci. U.S.A*. Nov. 2006. (6 pgs).

Webb, A.R., et al., "The role of sunlight in the Cutaneous production of vitamin D3," *Annual Review of Nutrition*. 1988. (6 pgs).

Webb, AR., et al., "Sunlight regulates the cutaneous production of vitamin D3 by causing its photodegradation," *The Journal of Clinical Endocrinology and Metabolism*. May 1989. (6 pgs).

Weinstock, MA. "Assessment of sun sensitivity by questionnaire: validity of items and formulation of a prediction rule," *Journal of Clinical Epidemiology*. Aug. 2006. (6 pgs).

Whitmore, SE., et al., "Tanning salon exposure and molecular alterations," *Journal of the American Academy of Dermatology*. May 2001. (6 pgs).

Youn, JI., et al., "Assessment of the usefulness of skin phototype and skin color as the parameter of cutaneous narrow band UVB sensitivity in psoriasis patients," *Photodermatology, Photoimmunology and Photomedicine*. Oct. 2003. (4 pgs).

Extended European Search Report for co-pending European Patent Application No. 17195774.9, Applicant: BeneSol, Inc., Date of Mailing: May 17, 2018, 9 pages.

English translation of Chinese Office Action received for CN Application No. 201610833794.9, Applicant: BeneSol, Inc., Date of Mailing: Aug. 1, 2018, 13 pages.

First Examination Report for co-pending Australian Patent Application No. 2018200369, Applicant: BeneSol, Inc., Date of Mailing: Jun. 22, 2018, 2 pages.

Examiner's Report for co-pending Canadian Patent Application No. 2,861,620, Applicant: BeneSol, Inc., Date of Mailing: Jul. 24, 2018, 4 pages.

Notice of Opposition filed for co-pending European Patent Application No. 13733883.6, issued as 2800605, Applicant: BeneSol, Inc., Date of Mailing: Jul. 31, 2018, 33 pages.

"Ergoline Vitamin D3 Solarium mit Dr. Holick UV-Systems," Sep. 2005, Ergoline GMBH Germany, Internet: www.ergoline. DE, 112 pages.

"Solaria Köln 2005," International Trade Fair for Sunlight Systems, Oct. 2005, English Google machine translation included, 9 pages.

"Center Wavelength (CW) and Full Width at Half Maximum (GWHM) filter numbers," webpage at http://mdc.custhelp.com/app/answers/detail/a_id/19235/-/center-wavelength-%28cw%29-and-full-width-at-half-maximum-%28fwhm%29-filter-numbers, published Mar. 16, 2011, 1 page.

English Translation of Chinese Office Action for Application No. 201480066635.X, Applicant: BeneSol, Inc., Date of Mailing: Nov. 7, 2017, 11 pages.

Fitzpatrick, "The validity and practicality of sun-reactive skin types I through VI," Arch Dermatol. Jun. 1988, 124(6):869-71, 3 pages.

(56) References Cited

OTHER PUBLICATIONS

International Search Report and Written Opinion for International Application No. PCT/US2018/065542 filed Dec. 13, 2018, Applicant: BeneSol, Inc., Date of Mailing: Mar. 26, 2019, 8 pages.
English translation of Chinese Office Action received for CN Application No. 201680021252.X, Applicant: BeneSol, Inc., Date of Mailing: Jan. 18, 2019, 17 pages.
International Search Report and Written Opinion for International Application No. PCT/US2018/065537 filed Dec. 13, 2018, Applicant: BeneSol, Inc., Date of Mailing: Mar. 1, 2019, 10 pages.
Extended European Search Report for European Patent Application No. 16787092.2, Applicant: BeneSol, Inc., Date of Mailing: Jan. 18, 2019, 9 pages.
Extended European Search Report received for European Patent Application No. 17858943.8, Applicant: BeneSol, Inc., Date of Mailing: May 12, 2020, 9 pages.
Extended European Search Report received for European Patent Application No. 20183232.6, Applicant: BeneSol, Inc., Date of Mailing: Nov. 24, 2020, 8 pages.
Examiner's Requisition for Canadian Patent Application No. 2,861,620, Date of Mailing Nov. 5, 2021, 3 pages.
Extended European Search Report for European Patent Application No. 18888140.3, Date of Mailing Aug. 25, 2021, 8 pages.
Extended European Search Report for European Patent Application No. 18887658.5, mailing date Sep. 27, 2021, 8 pages.
English translation of Chinese Office Action received for CN Application No. 201680037887.9, Applicant: BeneSol, Inc., Date of Mailing: Mar. 19, 2019, 19 pages.
Extended European Search Report received for European Patent Application No. 21192571.4, Applicant: BeneSol, Inc., Date of Mailing: Feb. 3, 2022, 10 pages.
Examination Report mailed Jan. 10, 2024 for European Patent Application No. 18888140.3, 4 pages.
Examiner's Report for Canadian Patent Application No. 2,861,620, Applicant: BeneSol, Inc., Date of Mailing: Jun. 14, 2023, 3 pages.
Examiner's Report for Canadian Patent Application No. 2,861,620, Applicant: BeneSol, Inc., Date of Mailing: Mar. 8, 2024, 4 pages.
Examiner's Report for Canadian Patent Application No. 3,036,581, Applicant: BeneSol, Inc., Date of Mailing: Feb. 29, 2024, 4 pages.
Examiner's Report mailed Feb. 14, 2025 for Canadian Patent Application No. 3,085,326, 5 pages.
Examiner's Report mailed Jan. 21, 2025 for Canadian Patent Application No. 3,085,327, 4 pages.
Extended European Search Report mailed Feb. 27, 2025 for European Patent Application No. 24199219.7, 9 pages.
Extended European Search Report mailed Jul. 23, 2024 for European Patent Application No. 21859096.6, 8 pages.
International Search Report and Written Opinion mailed Dec. 16, 2024 for International Patent Application No. PCT/US24/41352, 21 pages.
International Search Report and Written Opinion mailed Feb. 3, 2022 in International Patent Application No. PCT/US21/46578, 17 pages.
International Search Report and Written Opinion mailed Jan. 19, 2018 in International Patent Application No. PCT/US17/54578, 15 pages.
Invitation to Pay Additional Fees and Partial International Search dated Oct. 25, 2024 in International Patent Application No. PCT/US24/41352, 12 pages.

* cited by examiner

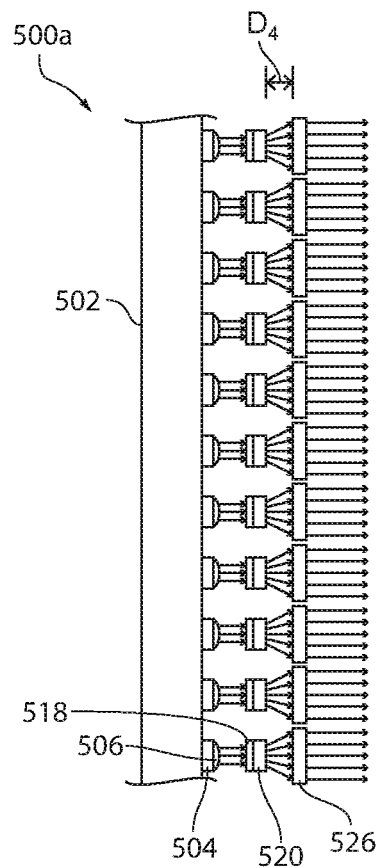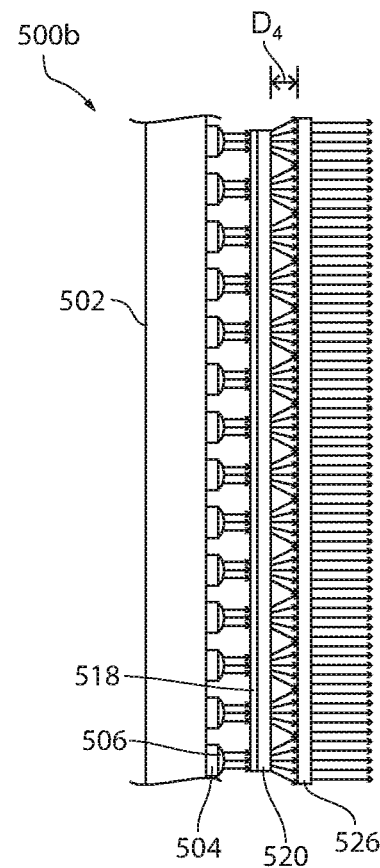
Fig. 5A  Fig. 5B
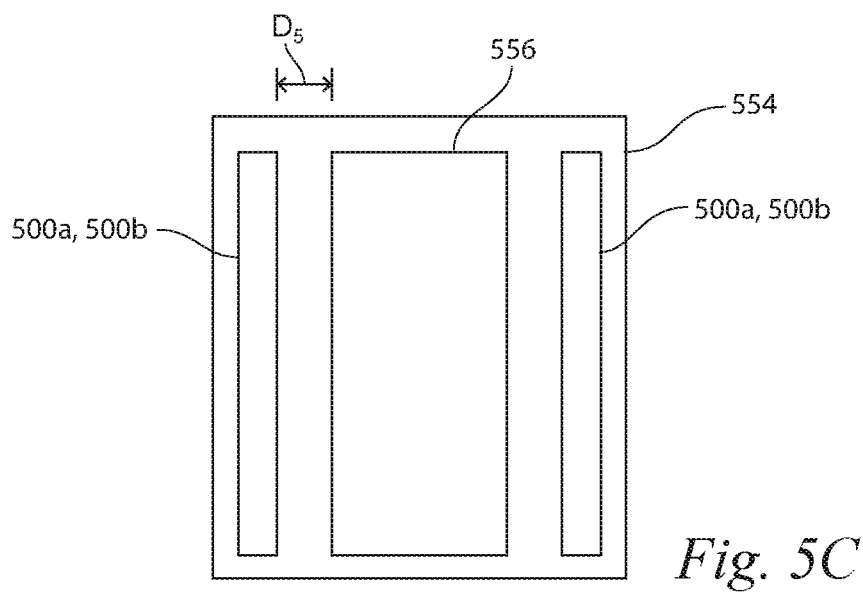
Fig. 5C

PHOTOTHERAPEUTIC SYSTEMS INCLUDING SPREADING AND COLLIMATING FEATURES AND RELATED TECHNOLOGY

CROSS-REFERENCE TO RELATED APPLICATIONS

This application is a 35 U.S.C. § 371 U.S. National Phase application of International Patent Application No. PCT/US2017/054578, filed Sep. 29, 2017, entitled "PHOTOTHERAPEUTIC_SYSTEMS INCLUDING SPREADING AND COLLIMATING FEATURES AND RELATED TECHNOLOGY," which claims priority to U.S. Provisional Patent Application No. 62/403,590, filed Oct. 3, 2016, entitled "PHOTOTHERAPEUTIC SYSTEMS INCLUDING SPREADING AND COLLIMATING FEATURES AND RELATED TECHNOLOGY," the contents of which are hereby incorporated by reference in their entireties.

The following patent applications are incorporated herein by reference in their entireties:

International Application No. PCT/US2013/020179 entitled "PHOTOTHERAPEUTIC APPARATUS FOR FOCUSED UVB RADIATION AND VITAMIN D SYNTHESIS AND ASSOCIATED SYSTEMS AND METHODS";

International Application No. PCT/US2014/062352 entitled "SYSTEMS AND METHODS FOR INCREASED VITAMIN D3 PRODUCTION";

International Application No. PCT/US2016/016873 entitled "SYSTEMS AND METHODS FOR TARGETED UVB PHOTOTHERAPY FOR DERMATOLOGIC DISORDERS AND OTHER INDICATIONS"; and International Application No. PCT/US2016/029615 entitled "SYSTEMS AND METHODS FOR TARGETED UVB PHOTOTHERAPY FOR AUTOIMMUNE DISORDERS AND OTHER INDICATIONS."

To the extent the foregoing patent publications or any other material incorporated herein by reference conflicts with the present disclosure, the present disclosure controls.

TECHNICAL FIELD

The present technology is related to phototherapeutic systems, devices, and methods, such as phototherapeutic systems well-suited for vitamin D phototherapy and treating skin conditions.

BACKGROUND

Vitamin D refers to a group of fat-soluble secosteroids that the human body can synthesize through adequate exposure to sunlight or UV radiation. More specifically, previtamin D3 is made in the skin when 7-dehydrocholesterol ("7-DHC") reacts with ultraviolet B ("UVB") light. Vitamin D can also be absorbed from the various dietary sources, such as fatty fish (e.g., salmon and tuna), vitamin D fortified foods (e.g., dairy and juice products), and vitamin D supplements. Once absorbed, vitamin D travels through the bloodstream to the liver where it is converted into the prohormone calcidiol. The calcidiol is, in turn, converted into calcitriol (the hormonally active form of vitamin D) by the kidneys or monocyte-macrophages in the immune system. When synthesized by the monocyte-macrophages, calcitriol acts locally as a cytokine to defend the body against microbial invaders. Kidney-synthesized calcitriol circulates through the body to regulate the concentration of calcium and phosphate in the bloodstream, and thereby promotes adequate mineralization, growth, and reconstruction of the bones. Therefore, an inadequate level of vitamin D, (typically characterized by a calcidiol concentration in the blood of less than 20-40 ng/m$^2$) can cause various bone softening diseases, such as rickets in children and osteomalacia in adults. Vitamin D deficiency has also been linked to numerous other diseases and disorders, such as depression, heart disease, gout, autoimmune disorders, and a variety of different cancers.

Physicians have recommended vitamin D supplements as a preventative measure to increase vitamin D levels. The American Institute of Medicine, for example, recommends a daily dietary vitamin D intake of 600 international units (IU) for those 1-70 years of age, and 800 IU for those 71 years of age and older. Other institutions have recommended both higher and lower daily vitamin D doses. The limitations on daily dosages also reflect an effort to prevent ingesting too much vitamin D, which can eventually become toxic. In contrast, the human physiology has adapted to significantly higher daily doses of vitamin D from sunlight (e.g., 4,000-20,000 IU/day or more). UVB radiation has been identified as a more desirable source of vitamin D because of the ease at which vitamin D is produced from exposure to sunlight and the body's natural ability to inhibit excessive vitamin D intake through the skin.

The International Commission on Illumination (also known as Le Commission Internationale de l'Eclairage ("CIE")) has created two standardized action spectrums associated with UV radiation and vitamin D production: "The Erythema Reference Action Spectrum and Standard Erythema Dose" (ISO 7166:1999), used to determine erythema (i.e., sunburn) response to individual wavelengths from 250 nm to 400 nm; and "The Action Spectrum for the Production of Previtamin D3 in Human Skin" (CIE 174: 2006), used to determine the conversion efficiency of 7-DHC to previtamin D3 at individual wavelengths from 255 nm to 320 nm. After 7-DHC is converted to previtamin D3, it may be photoisomerized to either of two inert products, lumisterol or tachysterol, or it can undergo a reverse reaction and revert back to 7-DHC. These photoreactions are driven by continued UV radiation, but the absorption spectra of each photoproduct varies. A study used to create the CIE previtamin D3 action spectrum standardized the UV dosage to limit the conversion of 7-DHC to previtamin D3 to less than 5% to help mitigate any photoisomerization of previtamin D3 to photoproducts (e.g., lumisterol, tachysterol, and 7-DHC).

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical, similar, or analogous components or features of more than one embodiment of the present technology.

FIGS. 5A and 5B are partially schematic side views of radiation sources that can be used in phototherapeutic systems in accordance additional embodiments of the present technology.

FIG. 5C schematically illustrates a phototherapeutic system including any of the radiation sources shown in FIGS. 5A and 5B in accordance with another embodiment of the present technology.

DETAILED DESCRIPTION

Phototherapeutic systems, devices, and methods in accordance with at least some embodiments of the present technology include innovative features for spreading UV radiation and delivering the UV radiation to a human subject with a high degree of uniformity. A phototherapeutic system in accordance with a particular embodiment includes a UV radiation source configured to direct at least partially collimated UV radiation along a radiation path that extends to an irradiation zone configured to accommodate a human subject. The system further comprises a filter, a spreader, and a collimator disposed successively farther downstream from the radiation source along the radiation path. The spreader and the collimator respectively decrease and increase collimation of the UV radiation before the UV radiation reaches the subject. In at least some cases, UV radiation from a relatively small number of high-intensity sources is efficiently filtered and delivered to a subject with uniformity at least approaching that of natural sunlight. Furthermore, this high uniformity can be independent of the subject's position within the irradiation zone. Thus, phototherapeutic systems in accordance with at least some embodiments of the present technology are more practical, more effective, and/or offer a better user experience relative to conventional counterparts. Phototherapeutic systems in accordance with embodiments of the present technology can have these and/or other advantages relative to conventional counterparts whether or not such advantages are described herein.

Specific details of phototherapeutic systems, devices, and methods in accordance with several embodiments of the present technology are described herein with reference to FIGS. 1-7. Although phototherapeutic systems, devices, and methods may be described herein primarily or entirely in the context of vitamin D phototherapy, other contexts in addition to those described herein are within the scope of the present technology. For example, suitable features of described phototherapeutic systems can be implemented in the context of tanning, treatment of skin conditions (e.g., psoriasis), treatment of autoimmune conditions (e.g., Crohn's disease, rheumatoid arthritis, etc.), and/or treatment of seasonal affective disorder, among other examples. Furthermore, it should be understood, in general, that other systems, devices, and methods in addition to those disclosed herein are within the scope of the present technology. For example, systems, devices, and methods in accordance with embodiments of the present technology can have different and/or additional configurations, components, procedures, etc. than those disclosed herein. Moreover, a person of ordinary skill in the art will understand that systems, devices, and methods in accordance with embodiments of the present technology can be without various configurations, components, procedures, etc. disclosed herein without deviating from the present technology.

Figure 1:
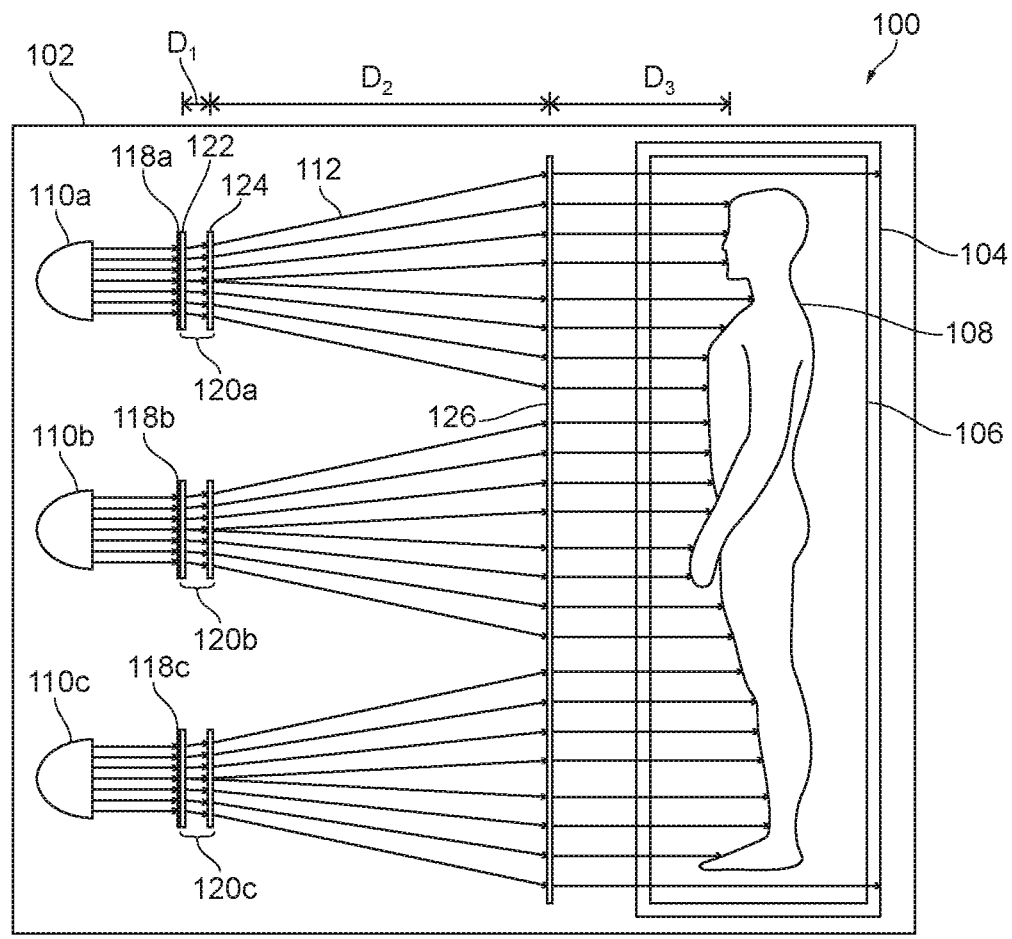
FIG. 1 is a partially schematic side view of a phototherapeutic system in accordance with an embodiment of the present technology.
Figure 2:
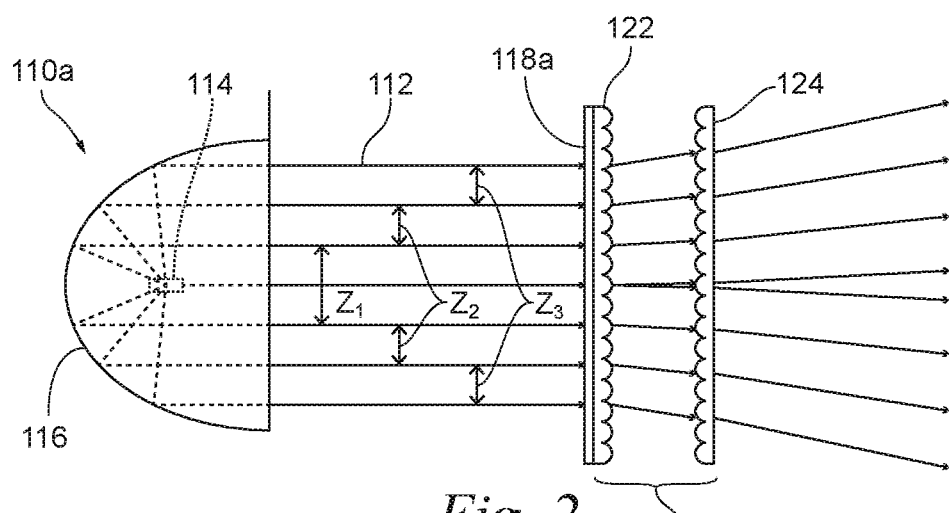
FIG. 2 is an enlarged partially schematic side view of a portion of the phototherapeutic system shown in FIG. 1.

FIG. 1 is a partially schematic side view of a phototherapeutic system 100 in accordance with an embodiment of the present technology, and FIG. 2 is an enlarged partially schematic side view of a portion of the phototherapeutic system 100. With reference to FIG. 1, the phototherapeutic system 100 can include a housing 102 at least partially defining a walk-in booth 104 (e.g., kiosk) and an irradiation zone 106 within the booth 104. In the illustrated embodiment, the booth 104 and the irradiation zone 106 are configured to fully receive a human subject 108 and to contain radiation within the booth 104. In other embodiments, counterparts of the booth 104 and the irradiation zone 106 can be configured to receive only a portion of the subject 108. For example, counterparts of the booth 104 and the irradiation zone 106 can be configured to receive only a torso, arm, leg, etc. of the subject 108. Furthermore, counterparts of the booth 104 and the irradiation zone 106 can be configured to receive the subject 108 in a supine, prone, reclined, or other suitable position rather than in the illustrated standing position.

As shown in FIG. 1, the phototherapeutic system 100 can include UV radiation sources 110 (individually identified as radiation sources 110a-110c) configured to direct UV radiation along corresponding radiation paths 112 (schematically represented by lines) extending from the radiation sources 110 to the irradiation zone 106. The radiation source 110a will now be described in additional detail with the understanding that the radiation sources 110b, 110c may have the same or similar features. As shown in FIG. 2, the radiation source 110a can be configured to direct at least partially collimated UV radiation along the corresponding radiation path 112. For example, the radiation source 110a can include a concentrated source 114 and a collimating reflector 116 shaped, positioned, or otherwise configured to reflect UV radiation generated at the concentrated source 114 and thereby increase collimation of this UV radiation. The concentrated source 114 can be a volume of plasma maintained by an applied voltage. For example, the concentrated source 114 can be a mercury-vapor lamp, a metal-halide lamp, a xenon short-arc lamp, or another suitable type of high-intensity discharge lamp. Alternatively, the concentrated source 114 can generate the UV radiation in another suitable manner. For example, counterpart light-emitting diode concentrated sources are described below in the context of another embodiment of the present technology.

With reference to FIGS. 1 and 2 together, the phototherapeutic system 100 can further include filters 118 (individually identified as filters 118a-118c) disposed along the radiation paths 112 downstream from the radiation sources 110. The filters 118 can be configured to preferentially permit passage of UV radiation with relatively high potential to promote vitamin D production and/or relatively low potential to cause erythema. Correspondingly, the filters 118 can be configured to preferentially block passage of UV radiation with relatively low potential to promote vitamin D production and/or relatively high potential to cause erythema. For example, the filters 118 can be configured to preferentially permit passage of UV radiation at a wavelength of about 297 nm (e.g., 292 nm to 304 nm, and in particular 297 nm+/−3 nm). Other suitable features and alternative forms of the housing 102, the booth 104, the irradiation zone 106, the radiation sources 110, and the filters 118 of the phototherapeutic system 100 are described in the applications incorporated herein by reference.

In at least some cases, it is advantageous for the filters 118 to receive collimated UV radiation rather than non-collimated UV radiation. For example, transmission of UV radiation through the filters 118 may depend on both wavelength and angle of incidence. If the filters 118 receive UV radiation at a wide range of non-normal angles of incidence it may be difficult to filter consistently all but a narrow range of wavelengths. Conversely, if the filters 118 receive UV radiation predominantly at a normal angle of incidence, it can be relatively straightforward to achieve this functionality. Although advantageous for filtering, collimation of UV radiation may be disadvantageous for efficient delivery of the UV radiation to a large area. For example, the filtered, collimated UV radiation emanating from the radiation sources 110 and the filters 118, without further processing, would be concentrated in only a small zone $Z_1$ of the beam because the center of the beam of collimated light would have a much higher intensity than the outer portion of the beam. Outer zones $Z_2$ and $Z_3$ of the beam generally have decreasing intensity. As a result, the dose of radiation delivered to the subject 108 in the outer zones $Z_2$ and $Z_3$ of the beam would be limited by the amount of radiation that produces an unacceptable level of exposure in the small area of the subject illuminated by the central zone $Z_1$ of the beam.

To promote efficient delivery of filtered UV radiation to a large area and/or for other reasons, the phototherapeutic system 100 can include spreaders 120 (individually identified as spreaders 120a-120c) disposed along the radiation paths 112 downstream from the filters 118. In some embodiments, the spreaders 120a-120c carry the corresponding filters 118a-118c. For example, the filters 118a-118c can include films overlying flat upstream surfaces of the corresponding spreaders 120a-120c. In other embodiments, counterparts of the filters 118 can be supported independently from the spreaders 120, such as being carried by corresponding counterparts of the radiation sources 110a-110c, or the filters 118 can have other suitable configurations. The filters 118 can be oriented to receive UV radiation at a zero degree angle of incidence. Accordingly, the filters 118 can be carried by flat surfaces oriented to be perpendicular to immediately upstream portions of the radiation paths 112, such as flat upstream surfaces of the spreaders 120 having this orientation.

As shown in FIG. 1, the spreaders 120 can expand the filtered, collimated UV radiation downstream from the filters 118 so that the UV radiation extends throughout at least one side of the irradiation zone 106. In at least some cases, the spreaders 120 expand the UV radiation without scattering the UV radiation to any significant degree. The spreaders 120a-120c can include a first array of lenslets 122 and a second array of lenslets 124 spaced apart from one another along the radiation paths 112 by a distance $D_1$. The first array of lenslets 122 can refract the UV radiation to form a beam having a first level of divergence. The second array of lenslets 124 can further refract the UV radiation to form a beam having a second level of divergence greater than the first level of divergence. The distance $D_1$ can be adjusted to change the overall degree of divergence of the UV radiation within the phototherapeutic system 100, such as to change the size of the irradiation zone 106. As shown in FIG. 2, in the illustrated embodiment, the first array of lenslets 122 has a planar upstream surface and a convex downstream surface, and the second array of lenslets 124 has a convex upstream surface and a planar downstream surface. In other embodiments, the first and second arrays of lenslets 122, 124 can have other suitable configurations. Furthermore, one or both of the first and second arrays of lenslets 122, 124 can carry optical films (e.g., coatings) other than the filters 118. For example, one or both of the first and second arrays of lenslets 122, 124 can carry antireflective films and/or films that modify optical density.

With reference to FIG. 1, at a certain distance ($D_2$) along the radiation paths 112 downstream from the spreaders 120, the UV radiation can achieve a desirable (e.g., optimal) level of spreading to provide relative uniformity across the skin surface. Unfortunately, in the context of phototherapy, $D_2$ is unlikely to correspond to the actual distance between the spreaders 120 and the subject 108 throughout the irradiation zone 106. For example, the subject's body shape and position within the irradiation zone 106 may be difficult to predict and may vary considerably from one subject to another. Furthermore, the subject 108 may move during a phototherapy session. These and other factors can affect the distance between the spreaders 120 and a given portion of the subject's skin. Even if the spreaders 120 are adjusted to cause $D_2$ to be within an expected range of distances between the spreaders 120 and the subject 108, the actual distance between the spreaders 120 and some portions of the subject 108 will be less than $D_2$, and the actual distance between the spreaders 120 and other portions of the subject 108 will be greater than $D_2$. Portions of the subject 108 closer to the spreaders 120 may be between diverging beams of UV radiation, thus receiving less than a desirable level of exposure or may be within a diverging beam of UV radiation, thus receiving more than a desirable level of exposure. Other portions of the subject 108 farther from the spreaders 120 may be at overlapping portions of diverging beams of UV radiation, thus also receiving more than a desirable level of exposure.

To promote uniform delivery of filtered UV radiation to the subject 108 and/or for other reasons, the embodiment of the phototherapeutic system 100 shown in FIG. 1 further includes a collimator 126 disposed along the radiation paths 112 downstream from the spreaders 120. In at least some embodiments, the collimator 126 includes a Fresnel lens. The collimator 126 increases collimation of UV radiation downstream from the spreaders 120 such that further divergence of the UV radiation between the collimator 126 and the subject 108 is reduced or eliminated. Thus, over the length of the radiation paths 112, the UV radiation originating at the concentrated source 114 is collimated at the collimating reflectors 116, spread at the spreaders 120, and re-collimated at the collimator 126. By collimating the UV radiation after the spreaders 120, the UV radiation can be delivered to the subject 108 uniformly irrespective of the distance ($D_3$) between the collimator 126 and the subject 108 within the irradiation zone 106.

Figure 3:
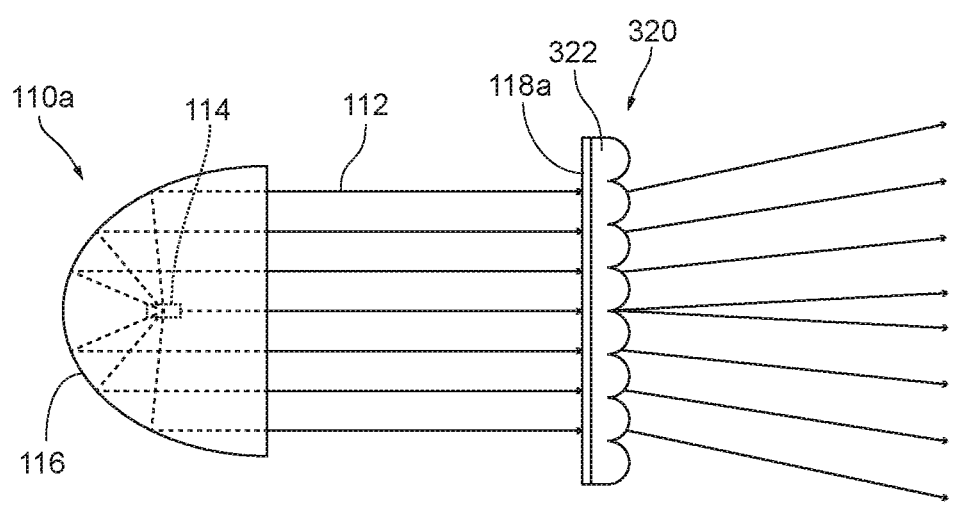
FIG. 3 is an enlarged partially schematic side view of a portion of a phototherapeutic system in accordance another embodiment of the present technology.

FIG. 3 illustrates an alternative embodiment of a spreader 320 including a single lenslet array 322 instead of the spreaders 120 (FIG. 1) that have a plurality of lenslet arrays 122 and 124. The lenslet array 322 is thicker than the lenslet arrays 122 and 124 individually, and thus it may be possible to achieve the same level of divergence of UV radiation from a given source using the single lenslet array 322 of relatively thick material rather than using multiple, spaced-apart lenslet arrays of relatively thinner material. In systems in accordance with still other embodiments of the present technology, counterparts of the radiation sources 110, the spreaders 120, and other components of the phototherapeutic system 100 can have other suitable forms.

Figure 4:
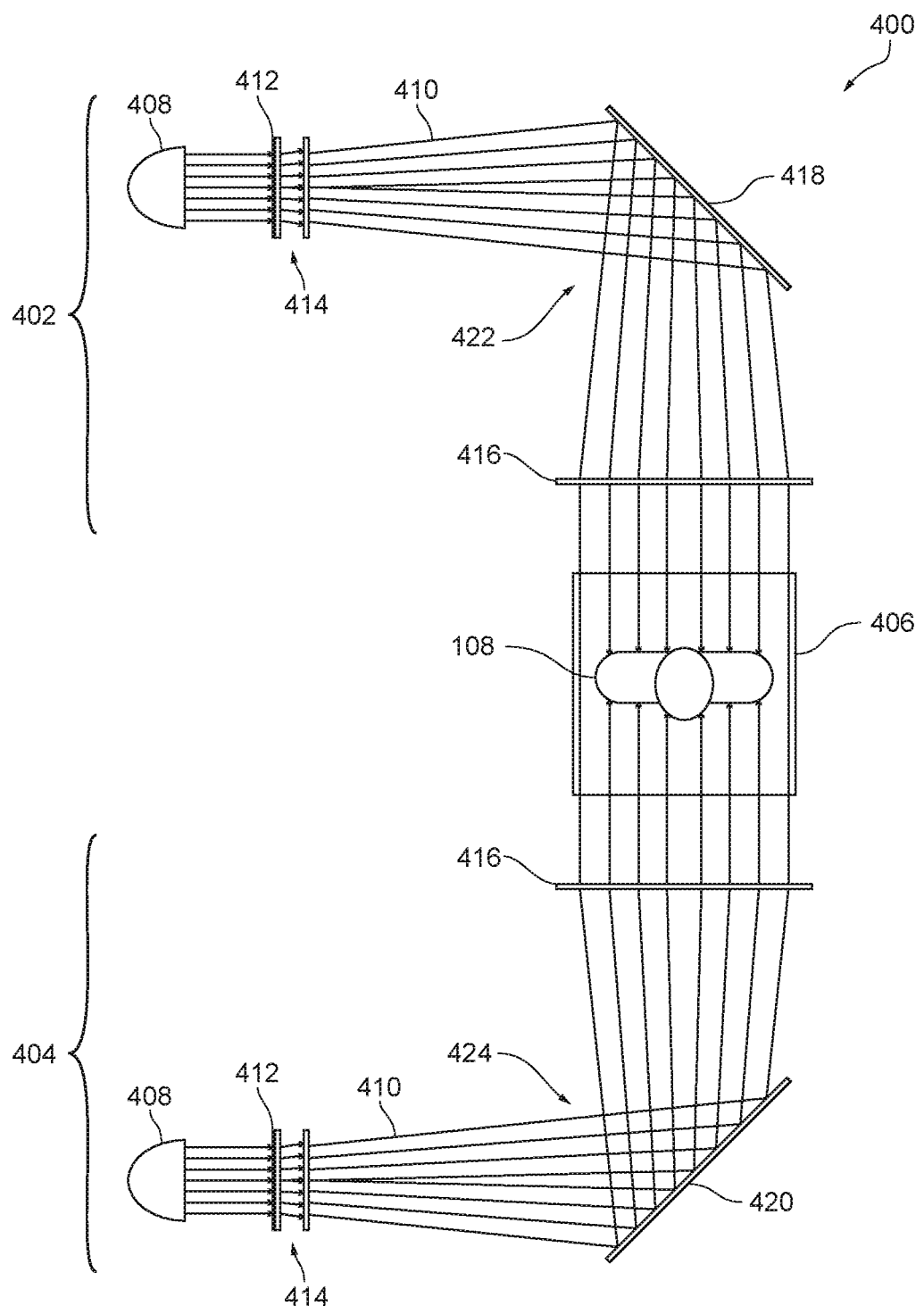
FIG. 4 is a partially schematic top plan view of a phototherapeutic system in accordance with another embodiment of the present technology.

FIG. 4 is a partially schematic top plan view of a phototherapeutic system 400 in accordance with another embodiment of the present technology. The phototherapeutic system 400 can include a first UV radiation assembly 402 and a second UV radiation assembly 404 configured to provide UV radiation to an irradiation zone 406 via opposite respective sides of the irradiation zone 406. Individually, the first and second UV radiation assemblies 402, 404 can include a radiation source 408, radiation paths 410, a filter 412, a spreader 414, and a collimator 416 similar to the corresponding features of the phototherapeutic system 100 (FIG. 1). In addition to these components, the first and second UV radiation assemblies 402, 404 can respectively include first and second reflectors 418, 420. The first and second reflectors 418, 420 can be configured to create first and second folds 422, 424 in the corresponding radiation paths 410 downstream from the corresponding spreaders 414 and upstream from the corresponding collimators 416. The first and second reflectors 418, 420 can be advantageous, for example, to increase the effective distance between the corresponding spreaders 414 and collimators 416 in a smaller footprint compared to a counterpart system having a straight radiation path without the first and second folds 422, 424. This can allow for a greater degree of divergence of UV radiation approaching the irradiation zone 406 without requiring that the overall phototherapeutic system 400 be unduly long.

In the illustrated embodiment, the first and second reflectors 418, 420 fold the corresponding radiation paths 410 at right angles. In other embodiments, the first and second reflectors 418, 420 can fold the corresponding radiation paths 410 at other suitable angles. Furthermore, additional reflectors can be incorporated along the radiation paths 410 to further extend the distances between the spreaders 414 and collimators 416 within a desired footprint for the phototherapeutic system 400. Phototherapeutic systems in accordance with still other embodiments can include only one of the first and second UV radiation assemblies 402, 404 or more than two UV radiation assemblies with or without folding reflectors. Individually, the first and second UV radiation assemblies 402, 404 can include any suitable number of radiation sources 408. Features such as the angles of the reflectors, the number of reflectors, the orientations of the UV radiation assemblies, and the number of UV radiation assemblies, among other features, can be modified to achieve desirable form factors in phototherapeutic systems in accordance with various embodiments of the present technology.

FIGS. 5A and 5B are partially schematic side views of radiation sources 500a and 500b, respectively, that can be used in phototherapeutic systems in accordance additional embodiments of the present technology. The radiation sources 500a, 500b include a light-emitting diode (LED) array 502 instead of the radiation sources 110 (FIG. 1). The LED array 502 can include a plurality of LEDs 504 that act as concentrated sources for generating UV radiation. The radiation sources 500a, 500b can further include collimating lenses 506 attached to the LEDs 504 or spaced immediately downstream from the LEDs 504. The collimating lenses 506 can be configured so that each LED 504 has a corresponding collimating lens 506. The collimating lenses 506 are configured to refract UV radiation generated at the LEDs 504 and thereby increase collimation of the UV radiation, and thus they can serve a purpose similar to that of the collimating reflector 116 (FIG. 2).

The radiation sources 500a, 500b can further include one or more filters 518 and spreaders 520 aligned with the individual LEDs 504. Although the LEDs 504 can emit radiation in a narrow bandwidth (e.g., 15-20 nm), several phototherapeutic procedures benefit from even narrower bandwidths (e.g., 2-5 nm). As such, the filters 518 are still generally desirable for use with the LEDs 504 in the radiation sources 500a, 500b. In the embodiment of the radiation source 500a, individual filters 518 and spreaders 520 are aligned with a corresponding LED 504. In the embodiment of the radiation source 500b, a single array-sized filter 518 and spreader 520 are used. The radiation sources 500a, 500b also include at least one collimator 526 spaced apart from the spreaders 520 by a distance $D_4$. For example, the radiation source 500a has a plurality of collimators 526 with each collimator 526 being aligned with a corresponding LED 504, while the radiation source 500b has a single array-sized collimator 526. The distance $D_4$ is set such that radiation from one LED 504 begins to overlap radiation from adjacent LEDs 504. As a result, the radiation from the LEDs 504 is spread to the point it is at least substantially uniform, and then the radiation is re-collimated at the collimator 526.

Because the LEDs 504 are generally small, a large number of LEDs 504 can be spaced relatively close to each other so that the LED array 502 is a large panel of concentrated sources that each produce a common distribution of radiation. The LED array 502 thus produces a relatively more uniform distribution of light at a close distance to the LED array 502 compared to the radiation sources 110 (FIG. 1). As a result, embodiments using an LED array 502 as the radiation source do not necessarily need to space the spreaders 520 as far apart from the collimators 526 as compared to the radiation sources 110 that have a highly non-uniform distribution of radiation.

FIG. 5C schematically illustrates a phototherapeutic system 550 having a booth 554, a radiation zone 556, and any of the radiation sources 500a and/or 500b. In this embodiment, the radiation sources 500a, 500b are spaced apart from the radiation zone 556 by a distance $D_5$ that is much shorter than the distance $D_1+D_2+D_3$ between the radiation sources 110a-110c and the radiation zone 106 illustrated in FIG. 1. This is expected to reduce the size of the booth 554 compared to the booth 104 illustrated in FIG. 1 or the booth necessary for the phototherapeutic system 400 illustrated in FIG. 4. This can be a significant advantage because floor space is often a limiting factor in many types of installations. In other embodiments, the booth 104 can be replaced with a wearable substrate (e.g., a blanket, a garment, a cuff, etc.) configured for close contact with a subject's skin.

Figure 6A:
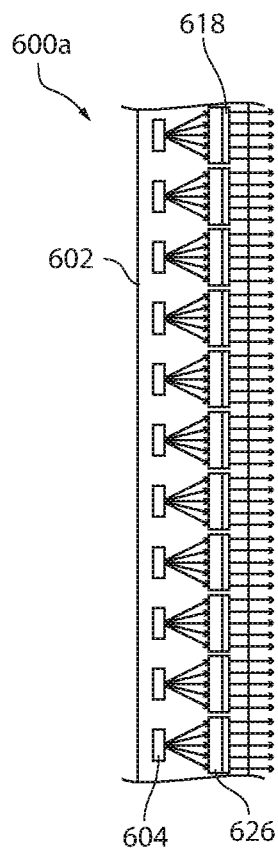
FIGS. 6A and 6B are partially schematic side views of radiation sources that can be used in wearable phototherapeutic devices in accordance additional embodiments of the present technology.
Figure 6B:
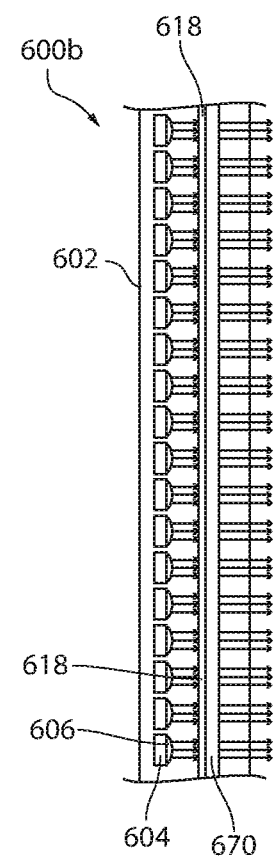
Figure 6C:
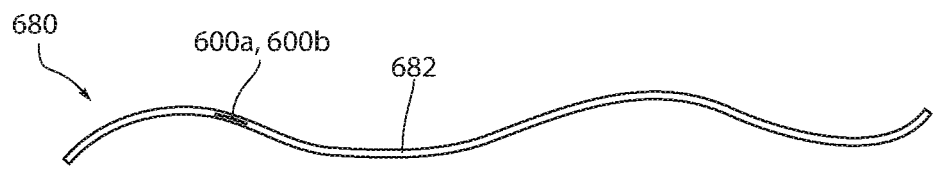
FIG. 6C schematically illustrates a wearable phototherapeutic device including any of the radiation sources shown in FIGS. 6A and 6B in accordance with another embodiment of the present technology.

FIGS. 6A and 6B are partially schematic side views of radiation sources 600a and 600b, respectively, that can be used in phototherapeutic systems in accordance additional embodiments of the present technology. Similar to the radiation sources 500a, 500b (FIGS. 5A and 5B), the radiation sources 600a, 600b include a light-emitting diode (LED) array 602 including a plurality of LEDs 604 that act as concentrated sources for generating UV radiation. The radiation source 600a includes collimators 626 downstream from the LEDs 604, and a plurality of filters 618 downstream from the collimators 626. The radiation source 600b includes collimating lenses 606 attached to the LEDs 604 or spaced immediately downstream from the LEDs 604, and an array-sized filter 618 downstream from the collimating lenses 606. The radiation source 600b further includes a transparent backing 670 carrying the filter 618. FIG. 6C schematically illustrates a wearable phototherapeutic device 680 having a flexible substrate 682 and any of the radiation sources 600a and/or 600b carried by (e.g., embedded in) the flexible substrate 682. As with wearable counterparts of the booth 554 (FIG. 5C), the phototherapeutic device 680 can be a blanket, garment, cuff, or have another suitable form configured for close contact with a subject's skin.

Figure 7:
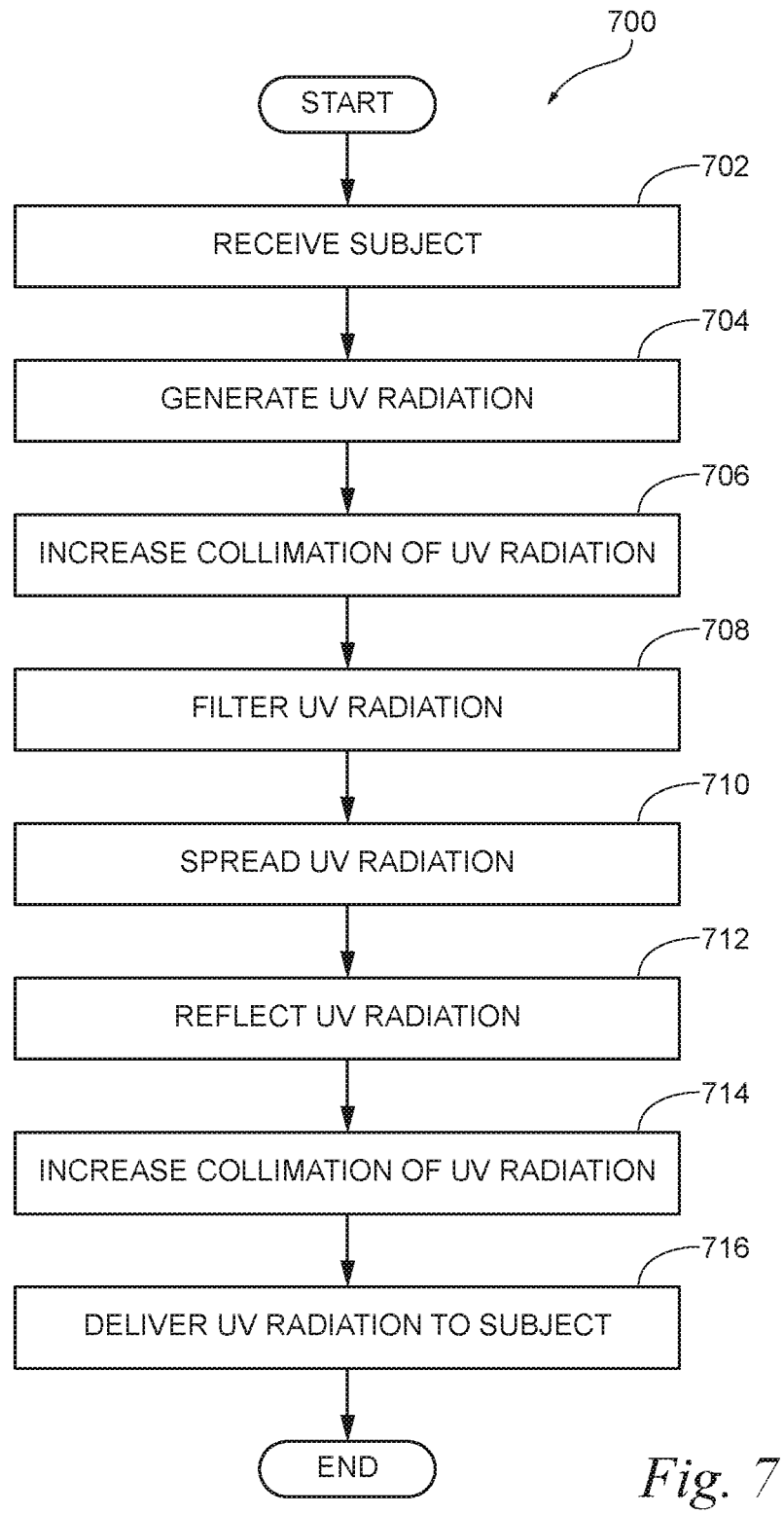
FIG. 7 is a flow chart illustrating a phototherapeutic method in accordance with an embodiment of the present technology.

FIG. 7 is a flow chart illustrating a phototherapeutic method 700 in accordance with an embodiment of the present technology. With reference to FIGS. 1-7 together, the method 700 can include receiving the subject 108 at the booth 104 (block 702). The method 700 can further include directing at least partially collimated UV radiation along the radiation paths 712, 710 to a skin surface of the subject 108 while the subject 108 is within the booth 104. In at least some cases, this includes generating the UV radiation at the concentrated sources 114 (block 704) and increasing collimation of the generated UV radiation (block 706). Increasing collimation of the generated UV radiation can occur by reflecting the UV radiation at the collimating reflectors 116, by refracting the UV radiation at the collimating lenses 506, or in another suitable manner. Next, the method 700 can include filtering the UV radiation directed along the radiation paths 112, 410 (block 708). When the method 700 is applied in the context of vitamin D phototherapy and in other cases, filtering the UV radiation can include preferentially permitting passage of UV radiation at a wavelength of about 297 nm relative to UV radiation at wavelengths greater than 304 nm and/or less than 292 nm.

After filtering the UV radiation, the method 700 can include spreading (e.g., spreading without scattering) the filtered UV radiation (block 710) and thereby decreasing collimation of the filtered UV radiation. Spreading the filtered UV radiation can occur at the first and second arrays of lenslets 122, 124. After passing through the first and second arrays of lenslets 122, 124, the UV radiation can form diverging beams. The method 700 can include reflecting these beams toward the skin surface of the subject 108 (block 712) and thereby folding the beams. Before the beams reach the skin surface of the subject 108, the method 700 can include increasing collimation of the UV radiation at the collimator 126, 416 (block 714). The UV radiation can then be delivered to the subject 108 (block 716) in a desirable manner, such as with high uniformity independent of the subject's position within the booth 104.

EXAMPLES

1. A phototherapeutic system, comprising:
a housing at least partially defining an irradiation zone, wherein the irradiation zone is configured to accommodate at least a portion of a human subject;
an ultraviolet (UV) radiation source configured to direct UV radiation along a radiation path extending from the radiation source to the irradiation zone;
a filter disposed along the radiation path downstream from the radiation source;
a spreader disposed along the radiation path downstream from the filter; and
a collimator disposed along the radiation path downstream from the spreader.

2. The phototherapeutic system of example 1 wherein: the radiation source is configured to direct at least partially collimated UV radiation along the radiation path; the spreader decreases collimation of UV radiation from the radiation source; and the collimator increases collimation of UV radiation from the radiation source.

3. The phototherapeutic system of example 1 wherein the radiation path includes a fold downstream from the spreader and upstream from the collimator, and wherein the system further comprises a folding reflector configured to define the fold.

4. The phototherapeutic system of example 1 wherein the housing at least partially defines a walk-in booth, and wherein the irradiation zone is within the booth.

5. The phototherapeutic system of example 1 wherein the filter is configured to preferentially permit passage of UV radiation at a wavelength of about 297 nm relative to UV radiation at wavelengths greater than 304 nm or less than 292 nm.

6. The phototherapeutic system of example 1 wherein the filter includes a film carried by the spreader at an upstream surface of the spreader.

7. The phototherapeutic system of example 1 wherein the radiation source includes:
a concentrated source at which UV radiation is generated; and
a collimating reflector configured to reflect UV radiation generated at the concentrated source and thereby increase collimation of the UV radiation generated at the concentrated source.

8. The phototherapeutic system of example 7 wherein the concentrated source is an arc lamp.

9. The phototherapeutic system of example 1 wherein the radiation source includes:
a concentrated source at which UV radiation is generated; and
a collimating lens configured to refract UV radiation generated at the concentrated source and thereby increase collimation of the UV radiation generated at the concentrated source.

10. The phototherapeutic system of example 9 wherein the concentrated source is a light-emitting diode.

11. The phototherapeutic system of example 1 wherein the spreader includes an array of lenslets.

12. The phototherapeutic system of example 11 wherein the array of lenslets has a flat upstream surface, and wherein the filter includes a film overlying the upstream surface of the array of lenslets.

13. The phototherapeutic system of example 11 wherein the array of lenslets is a first array of lenslets, and wherein the spreader includes a second array of lenslets spaced apart from the first array of lenslets along the radiation path.

14. A phototherapeutic system, comprising:
a housing at least partially defining an irradiation zone, wherein the irradiation zone is configured to accommodate at least a portion of a human subject;
a first ultraviolet (UV) radiation assembly including—
a first UV radiation source configured to direct UV radiation along a first radiation path extending from the first radiation source to the irradiation zone,
a first spreader disposed along the first radiation path downstream from the first radiation source, and
a first collimator disposed along the first radiation path downstream from the first spreader; and
a second ultraviolet UV radiation assembly including—
a second UV radiation source configured to direct UV radiation along a second radiation path extending from the second radiation source to the irradiation zone, a second spreader disposed along the second radiation path downstream from the second radiation source, and a second collimator disposed along the second radiation path downstream from the second spreader.

15. The phototherapeutic system of example 14 wherein:
the first and second radiation sources are configured to direct at least partially collimated UV radiation along the first and second radiation paths, respectively;
the first and second spreaders decrease collimation of UV radiation from the first and second radiation sources, respectively; and
the first and second collimators increase collimation of UV radiation from the first and second radiation sources, respectively.

16. The phototherapeutic system of example 14 wherein:
the first radiation path includes a first fold downstream from the first spreader and upstream from the first collimator;
the second radiation path includes a second fold downstream from the second spreader and upstream from the second collimator;
the first UV radiation assembly includes a first folding reflector configured to define the first fold; and
the second UV radiation assembly includes a second folding reflector configured to define the second fold.

17. The phototherapeutic system of example 14 wherein the housing at least partially defines a walk-in booth, and wherein the irradiation zone is within the booth.

18. The phototherapeutic system of example 14 wherein:
the first UV radiation assembly includes a first filter disposed along the first radiation path downstream from the first radiation source and upstream from the first spreader; and
the second UV radiation assembly includes a second filter disposed along the second radiation path downstream from the second radiation source and upstream from the second spreader.

19. The phototherapeutic system of example 18 wherein the first and second filters are configured to preferentially permit passage of UV radiation at a wavelength of about 297 nm relative to UV radiation at wavelengths greater than 304 nm or less than 292 nm.

20. The phototherapeutic system of example 18 wherein:
the first filter includes a first film carried by the first spreader at an upstream surface of the first spreader; and
the second filter includes a second film carried by the second spreader at an upstream surface of the second spreader.

21. The phototherapeutic system of example 14 wherein:
the first radiation assembly includes—
a first concentrated source at which UV radiation is generated, and
a first collimating reflector configured to reflect UV radiation generated at the first concentrated source and thereby increase collimation of the UV radiation generated at the first concentrated source; and
the second radiation assembly includes—
a second concentrated source at which UV radiation is generated, and
a second collimating reflector configured to reflect UV radiation generated at the second concentrated source and thereby increase collimation of the UV radiation generated at the second concentrated source.

22. The phototherapeutic system of example 21 wherein the first and second concentrated sources are respective arc lamps.

23. The phototherapeutic system of example 14 wherein:
the first radiation assembly includes—
a first concentrated source at which UV radiation is generated, and
a first collimating lens configured to refract UV radiation generated at the first concentrated source and thereby increase collimation of the UV radiation generated at the first concentrated source; and
the second radiation assembly includes—
a second concentrated source at which UV radiation is generated, and
a second collimating lens configured to refract UV radiation generated at the second concentrated source and thereby increase collimation of the UV radiation generated at the second concentrated source.

24. The phototherapeutic system of example 23 wherein the first and second concentrated sources are respective light-emitting diodes.

25. The phototherapeutic system of example 14 wherein the first and second spreaders include respective arrays of lenslets.

26. The phototherapeutic system of example 25 wherein the arrays of lenslets are first arrays of lenslets, and wherein the first and second spreaders include respective second arrays of lenslets spaced apart from the corresponding first arrays of lenslets along the corresponding ones of the first and second radiation paths.

27. The phototherapeutic system of example 14 wherein the first and second radiation assemblies are configured to provide UV radiation to the irradiation zone via opposite respective sides of the irradiation zone.

28. A phototherapeutic method, comprising:
directing UV radiation along a radiation path extending from a radiation source to a skin surface of a human subject;
filtering the directed UV radiation;
spreading the filtered UV radiation; and
increasing collimation of spread UV radiation.

29. The phototherapeutic method of example 28 wherein:
directing the UV radiation includes directing at least partially collimated UV radiation;
filtering the directed UV radiation includes filtering the at least partially collimated UV radiation; and
spreading the filtered UV radiation includes spreading the filtered UV radiation and thereby decreasing collimation of filtered UV radiation.

30. The phototherapeutic method of example 28, further comprising reflecting the UV radiation toward the skin surface of the subject.

31. The phototherapeutic method of example 28, further comprising receiving the subject at a walk-in booth, wherein directing the UV radiation includes directing the UV radiation while the subject is within the booth.

32. The phototherapeutic method of example 28 wherein filtering the directed UV radiation includes preferentially permitting passage of UV radiation at a wavelength of about 297 nm relative to UV radiation at wavelengths greater than 304 nm or less than 292 nm.

33. The phototherapeutic method of example 28 wherein directing the UV radiation includes:
  generating the UV radiation at a concentrated source; and
  reflecting the UV radiation generated at the concentrated source and thereby increasing collimation of the UV radiation generated at the concentrated source.

34. The phototherapeutic method of example 33 wherein generating the UV radiation includes generating the UV radiation at an arc lamp.

35. The phototherapeutic method of example 28 wherein directing the UV radiation includes:
  generating the UV radiation at a concentrated source; and
  refracting the UV radiation generated at the concentrated source and thereby increasing collimation of the UV radiation generated at the concentrated source.

36. The phototherapeutic method of example 35 wherein generating the UV radiation includes generating the UV radiation at a light-emitting diode.

37. The phototherapeutic method of example 28 wherein spreading the filtered UV radiation includes refracting the filtered UV radiation at an array of lenslets.

38. The phototherapeutic method of example 28 wherein spreading the filtered UV radiation includes:
  refracting the filtered UV radiation at a first array of lenslets; and
  refracting the filtered UV radiation at a second array of lenslets spaced apart from the first array of lenslets along the radiation path.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like may be used herein to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. A phototherapeutic system, comprising:
  a housing at least partially defining an irradiation zone, wherein the irradiation zone is configured to accommodate at least a torso of a human subject;
  an ultraviolet (UV) radiation source configured to direct UV radiation in a forward direction along a radiation path extending from the radiation source to the irradiation zone;
  a collimating lens disposed along the radiation path downstream from the radiation source to increase collimation of the UV radiation passing through the collimating lens, the collimating lens positioned between the radiation source and the irradiation zone;
  a filter disposed along the radiation path downstream from the radiation source and the collimating lens to filter the UV radiation after collimation;
  a spreader disposed along the radiation path downstream from the filter; and
  a collimator disposed along the radiation path downstream from the spreader to collimate the UV radiation across the irradiation zone and deliver the UV radiation with a high degree of uniformity across the irradiation zone,
    wherein, when the torso is within the irradiation zone, the collimator is configured to expose a skin surface of the torso to highly uniform collimated UV radiation across the torso independent of a distance between the UV radiation source and the torso.

2. The phototherapeutic system of claim 1 wherein:
  the radiation source is configured to direct at least partially collimated UV radiation along the radiation path;
  the spreader decreases collimation of UV radiation from the radiation source; and
  the collimator increases collimation of UV radiation from the radiation source.

3. The phototherapeutic system of claim 1 wherein the radiation path includes a fold downstream from the spreader and upstream from the collimator, and wherein the system further comprises a folding reflector configured to define the fold.

4. The phototherapeutic system of claim 1 wherein the housing at least partially defines a walk-in booth, and wherein the irradiation zone is within the booth.

5. The phototherapeutic system of claim 1 wherein the filter is configured to preferentially permit passage of UV radiation at a wavelength of about 297 nm relative to UV radiation at wavelengths greater than 304 nm or less than 292 nm.

6. The phototherapeutic system of claim 1 wherein the filter includes a film carried by the spreader at an upstream surface of the spreader.

7. The phototherapeutic system of claim 1 wherein the radiation source includes:
  a concentrated source at which UV radiation is generated; and a collimating reflector configured to reflect UV radiation generated at the concentrated source and thereby increase collimation of the UV radiation generated at the concentrated source.

8. The phototherapeutic system of claim 7 wherein the concentrated source is an arc lamp.

9. The phototherapeutic system of claim 1 wherein the radiation source includes:
a concentrated source at which UV radiation is generated.

10. The phototherapeutic system of claim 9 wherein the concentrated source is a light-emitting diode.

11. The phototherapeutic system of claim 1 wherein the spreader includes an array of lenslets.

12. The phototherapeutic system of claim 11 wherein the array of lenslets has a flat upstream surface, and wherein the filter includes a film overlying the upstream surface of the array of lenslets.

13. The phototherapeutic system of claim 11 wherein the array of lenslets is a first array of lenslets, and wherein the spreader includes a second array of lenslets spaced apart from the first array of lenslets along the radiation path.

14. The phototherapeutic system of claim 1 wherein the collimator comprises a Fresnel lens.

15. A phototherapeutic system, comprising:
a housing at least partially defining an irradiation zone, wherein the irradiation zone is configured to accommodate at least a torso of a human subject;
a first ultraviolet (UV) radiation assembly including—
a first UV radiation source configured to direct UV radiation in a forward direction along a first radiation path extending from the first radiation source to the irradiation zone, the first UV radiation source including—
a first concentrated source at which the UV radiation is generated, and
a first collimating lens positioned downstream of the first concentrated source to increase collimation of the UV radiation generated at the first concentrated source, the first collimating lens positioned between the radiation source and the irradiation zone, wherein the UV radiation passes through the first collimating lens along a radiation path extending from the first concentrated source downstream to a skin surface of the human subject within the irradiation zone,
a first spreader disposed along the first radiation path downstream from the first radiation source, and
a first collimator disposed along the first radiation path downstream from the first spreader to collimate the UV radiation across a first portion of the irradiation zone and deliver the UV radiation with a high degree of uniformity across the first portion of the irradiation zone; and
a second ultraviolet (UV) radiation assembly including—
a second UV radiation source configured to direct UV radiation in a forward direction along a second radiation path extending from the second radiation source to the irradiation zone, the second radiation assembly includes—
a second concentrated source at which UV radiation is generated, and
a second collimating lens positioned downstream of the second concentrated source to increase collimation of the UV radiation generated at the second concentrated source, the second collimating lens positioned between the radiation source and the irradiation zone, wherein the UV radiation passes through the second collimating lens along the radiation path extending from the second concentrated source downstream to the skin surface of the human subject within the irradiation zone,
a second spreader disposed along the second radiation path downstream from the second radiation source, and
a second collimator disposed along the second radiation path downstream from the second spreader to collimate the UV radiation across a second portion of the irradiation zone and deliver the UV radiation with a high degree of uniformity across the second portion of the irradiation zone,
wherein, when the torso is within the first and second portions of the irradiation zone, the first and second collimators are configured to expose a skin surface of the torso to highly uniform collimated UV radiation across the torso independent of a distance between the UV radiation source and the torso.

16. The phototherapeutic system of claim 15 wherein:
the first and second radiation sources are configured to direct at least partially collimated UV radiation along the first and second radiation paths, respectively;
the first and second spreaders decrease collimation of UV radiation from the first and second radiation sources, respectively; and
the first and second collimators increase collimation of UV radiation from the first and second radiation sources, respectively.

17. The phototherapeutic system of claim 15 wherein:
the first radiation path includes a first fold downstream from the first spreader and upstream from the first collimator;
the second radiation path includes a second fold downstream from the second spreader and upstream from the second collimator;
the first UV radiation assembly includes a first folding reflector configured to define the first fold; and
the second UV radiation assembly includes a second folding reflector configured to define the second fold.

18. The phototherapeutic system of claim 15 wherein the housing at least partially defines a walk-in booth, and wherein the irradiation zone is within the booth.

19. The phototherapeutic system of claim 15 wherein:
the first UV radiation assembly includes a first filter disposed along the first radiation path downstream from the first radiation source and upstream from the first spreader; and
the second UV radiation assembly includes a second filter disposed along the second radiation path downstream from the second radiation source and upstream from the second spreader.

20. The phototherapeutic system of claim 19 wherein the first and second filters are configured to preferentially permit passage of UV radiation at a wavelength of about 297 nm relative to UV radiation at wavelengths greater than 304 nm or less than 292 nm.

21. The phototherapeutic system of claim 19 wherein:
the first filter includes a first film carried by the first spreader at an upstream surface of the first spreader; and
the second filter includes a second film carried by the second spreader at an upstream surface of the second spreader.

22. The phototherapeutic system of claim 15 wherein:
the first radiation assembly includes a first collimating reflector configured to reflect UV radiation generated at the first concentrated source and thereby increase collimation of the UV radiation generated at the first concentrated source; and
the second radiation assembly includes a second collimating reflector configured to reflect UV radiation generated at the second concentrated source and thereby increase collimation of the UV radiation generated at the second concentrated source.

23. The phototherapeutic system of claim 22 wherein the first and second concentrated sources are respective arc lamps.

24. The phototherapeutic system of claim 15 wherein the first and second concentrated sources are respective light-emitting diodes.

25. The phototherapeutic system of claim 15 wherein the first and second spreaders include respective arrays of lenslets.

26. The phototherapeutic system of claim 25 wherein the arrays of lenslets are first arrays of lenslets, and wherein the first and second spreaders include respective second arrays of lenslets spaced apart from the corresponding first arrays of lenslets along the corresponding ones of the first and second radiation paths.

27. The phototherapeutic system of claim 15 wherein the first and second radiation assemblies are configured to provide UV radiation to the irradiation zone via opposite respective sides of the irradiation zone.

28. A phototherapeutic method, comprising:
generating UV radiation at a concentrated source, wherein the UV radiation is directed in a forward direction toward an irradiation zone;
refracting the UV radiation generated at the concentrated source with a collimating lens positioned downstream of the concentrated source to increase collimation of the UV radiation generated at the concentrated source, wherein the collimating lens is positioned between the concentrated source and the irradiation zone, wherein the UV radiation passes through the collimating lens along a radiation path extending from the concentrated source downstream to a skin surface of a human subject, the skin surface corresponding to at least a torso within the irradiation zone;
filtering the UV radiation after collimation;
spreading the filtered UV radiation; and
increasing collimation of spread UV radiation to collimate the UV radiation across the irradiation zone and deliver the UV radiation with a high degree of uniformity across the irradiation zone,
wherein, when the torso is within the irradiation zone, the collimation exposes a skin surface of the torso to highly uniform collimated UV radiation across the torso independent of a distance between the concentrated source and the torso.

29. The phototherapeutic method of claim 28 wherein:
spreading the filtered UV radiation includes spreading the filtered UV radiation and thereby decreasing collimation of filtered UV radiation.

30. The phototherapeutic method of claim 28, further comprising reflecting the UV radiation toward the skin surface of the subject.

31. The phototherapeutic method of claim 28, further comprising:
receiving the subject at a walk-in booth; and
directing the UV radiation along the radiation path while the subject is within the booth.

32. The phototherapeutic method of claim 28 wherein filtering the UV radiation includes preferentially permitting passage of UV radiation at a wavelength of about 297 nm relative to UV radiation at wavelengths greater than 304 nm or less than 292 nm.

33. The phototherapeutic method of claim 28 further comprising:
reflecting the UV radiation generated at the concentrated source to direct the UV radiation along the radiation path.

34. The phototherapeutic method of claim 28 wherein generating the UV radiation includes generating the UV radiation at an arc lamp.

35. The phototherapeutic method of claim 28 wherein generating the UV radiation includes generating the UV radiation at a light-emitting diode.

36. The phototherapeutic method of claim 28 wherein spreading the filtered UV radiation includes refracting the filtered UV radiation at an array of lenslets.

37. The phototherapeutic method of claim 28 wherein spreading the filtered UV radiation includes:
refracting the filtered UV radiation at a first array of lenslets; and
refracting the filtered UV radiation at a second array of lenslets spaced apart from the first array of lenslets along the radiation path.

* * * * *